United States Patent
Mitchell et al.

(10) Patent No.: US 8,004,423 B2
(45) Date of Patent: Aug. 23, 2011

(54) INSTRUMENTED COMPONENT FOR USE IN AN OPERATING ENVIRONMENT

(75) Inventors: David J. Mitchell, Oviedo, FL (US); Anand A. Kulkarni, Oviedo, FL (US); Ramesh Subramanian, Oviedo, FL (US); Edward R. Roesch, Orlando, FL (US)

(73) Assignee: Siemens Energy, Inc., Orlando, FL (US)

( * ) Notice: Subject to any disclaimer, the term of this patent is extended or adjusted under 35 U.S.C. 154(b) by 1378 days.

(21) Appl. No.: 11/521,175

(22) Filed: Sep. 14, 2006

(65) Prior Publication Data
US 2010/0226756 A1    Sep. 9, 2010

Related U.S. Application Data

(63) Continuation-in-part of application No. 11/122,566, filed on May 5, 2005.

(60) Provisional application No. 60/581,662, filed on Jun. 21, 2004.

(51) Int. Cl.
*G08C 19/12* (2006.01)
(52) U.S. Cl. ............ 340/870.17; 73/754; 702/130; 702/117; 340/573.4; 374/141; 374/179
(58) Field of Classification Search ............ 340/870.17, 340/573.4; 374/141, 179; 702/130, 117; 73/754
See application file for complete search history.

(56) References Cited

U.S. PATENT DOCUMENTS

| | | |
|---|---|---|
| 3,876,998 A | 4/1975 | Richter et al. |
| 3,890,456 A | 6/1975 | Dils |
| 4,546,652 A | 10/1985 | Virkar et al. |
| 4,578,992 A | 4/1986 | Galasko et al. |
| 4,595,298 A | 6/1986 | Frederick |
| 4,812,050 A | 3/1989 | Epstein |
| 4,851,300 A | 7/1989 | Przybyszewski |

(Continued)

FOREIGN PATENT DOCUMENTS

GB    2327927 A    2/1999

(Continued)

OTHER PUBLICATIONS

*Sensors for Harsh Environments by Direct Write Thermal Spray.* By Jon, Longtin, et al. Center for Thermal Spray Research, State University of New York, Stony Brook, NY, and Robert Greenlaw. Integrated Coatings Solutions, Inc., Huntington Beach, CA.

(Continued)

*Primary Examiner* — Albert K Wong (57) ABSTRACT

An instrumented component (18, 19) for use in various operating environments such as the hot gas path section of a combustion turbine engine (10). The component (18, 19) may have a substrate, a sensor (50, 204, 210) connected with the substrate for sensing a condition of the component (18, 19) within the casing during operation of the combustion turbine (10) and a connector (52, 202) attached to the substrate and in communication with the sensor (50, 204, 210) for routing a data signal from the sensor (50, 204, 210) to a termination location (53). The component (18, 19) may include a wireless telemetry device (54, 202) in communication with the connector (52, 202) for wirelessly transmitting the data signal outside the casing. A transceiver (56) may be located outside the casing for receiving the data signal and transmitting it to a processing module (30) for developing information with respect to a condition of the component (18, 19) or a coating (26) deposited on the component (18, 19).

18 Claims, 7 Drawing Sheets

U.S. PATENT DOCUMENTS

| | | |
|---|---|---|
| 4,916,715 A | 4/1990 | Adiutori |
| 4,969,956 A | 11/1990 | Kreider et al. |
| 4,970,670 A | 11/1990 | Twerdochlib |
| 4,983,034 A | 1/1991 | Spillman, Jr. |
| 5,144,299 A | 9/1992 | Smith |
| 5,306,368 A | 4/1994 | Yamada et al. |
| 5,318,725 A | 6/1994 | Sandhage |
| 5,440,300 A | 8/1995 | Spillman, Jr. |
| 5,578,877 A | 11/1996 | Tiemann |
| 5,952,836 A | 9/1999 | Haake |
| 5,969,260 A | 10/1999 | Belk et al. |
| 5,969,348 A * | 10/1999 | Franzen ......... 250/282 |
| 5,970,393 A | 10/1999 | Khorrami et al. |
| 6,000,977 A | 12/1999 | Haake |
| 6,034,296 A | 3/2000 | Elvin et al. |
| 6,072,165 A | 6/2000 | Feldman |
| 6,102,565 A * | 8/2000 | Kita et al. ......... 374/179 |
| 6,109,783 A | 8/2000 | Dobler et al. |
| 6,127,040 A | 10/2000 | Grobbauer et al. |
| 6,142,665 A | 11/2000 | Haffner et al. |
| 6,197,424 B1 | 3/2001 | Morrison et al. |
| 6,262,550 B1 | 7/2001 | Kliman et al. |
| 6,280,083 B2 | 8/2001 | Kita et al. |
| 6,331,823 B1 | 12/2001 | El-Ibiary |
| 6,343,251 B1 | 1/2002 | Herron et al. |
| 6,398,503 B1 | 6/2002 | Takahashi et al. |
| 6,437,681 B1 | 8/2002 | Wang et al. |
| 6,512,379 B2 | 1/2003 | Harrold et al. |
| 6,523,383 B2 | 2/2003 | Joki et al. |
| 6,532,412 B2 | 3/2003 | Adibhatla et al. |
| 6,556,956 B1 | 4/2003 | Hunt |
| 6,576,861 B2 | 6/2003 | Sampath et al. |
| 6,591,182 B1 | 7/2003 | Cece et al. |
| 6,667,725 B1 | 12/2003 | Simons et al. |
| 6,677,683 B2 | 1/2004 | Klausing et al. |
| 6,729,187 B1 | 5/2004 | Gregory |
| 6,735,549 B2 | 5/2004 | Ridolfo |
| 6,756,131 B2 | 6/2004 | Oguma et al. |
| 6,756,908 B2 | 6/2004 | Gass et al. |
| 6,760,689 B2 | 7/2004 | Follin et al. |
| 6,796,187 B2 | 9/2004 | Srinivasan et al. |
| 6,808,813 B2 | 10/2004 | Kimura et al. |
| 6,816,817 B1 | 11/2004 | Retlich et al. |
| 6,831,555 B1 | 12/2004 | Miller et al. |
| 6,838,157 B2 | 1/2005 | Subramanian |
| 6,979,498 B2 | 12/2005 | Darolia et al. |
| 6,979,991 B2 | 12/2005 | Burns et al. |
| 7,004,622 B2 | 2/2006 | Hardwicke et al. |
| 7,009,310 B2 | 3/2006 | Cheung et al. |
| 7,360,437 B2 | 4/2008 | Hardwicke et al. |
| 2004/0101022 A1 * | 5/2004 | Hardwicke et al. ......... 374/141 |
| 2004/0113790 A1 | 6/2004 | Hamel et al. |
| 2004/0114666 A1 | 6/2004 | Hardwicke et al. |
| 2005/0198967 A1 | 9/2005 | Subramanian |
| 2005/0287386 A1 | 12/2005 | Sabol et al. |
| 2006/0018361 A1 | 1/2006 | Hardwicke et al. |
| 2006/0020415 A1 | 1/2006 | Hardwicke et al. |

FOREIGN PATENT DOCUMENTS

| | | |
|---|---|---|
| JP | 10122948 A | 10/1996 |

OTHER PUBLICATIONS

*Laser-Induced Materials and Processes for Rapid Prototyping*. By L. Lu, et al. Chapter 6: Metal-Based System Via Laser Melting. The National University of Singapore. Boston, Kluwer Academic Publishers.

*Direct-Write, Technologies for Rapid Prototyping Applications*: Sensors, Electronics, and Integrated Power Sources. Chapter 9: Direct-Write Thermal Spraying of Multilayer Electronics and Sensor Structures, by Sansay Sampath, et al. pp. 261-302. San Diego, CA: Academic Press.

*Advances in Thin Film Sensor Technologies for Engine Applications*. By Jih-Fen Lei et al. NASA Technical Memorandum 107418. Prepared for Turbo Expo Jun. 2-5, 1997, Orlando, Florida.

*Wireless Telemetry for Gas-Turbine Applications*. By Russel G. DeAnna. NASA Technical Memorandum 2000-209815, Mar. 2000.

*Thermophotovoltaic furnace-generator for the home using low bandgap GaSb cells*. By L.M. Fraas et al. Semiconductor Science and Technology, vol. 18, 2003, pp. S247-S253.

*Metallic thin-film thermocouple for thermoelectric microgenerators*. By E Casaano et al. Sensors and Actuators A 60, 1997, pp. 65-67.

*A novel thick-film piezoelectric micro-generator*. By N.M. White et al. Smart Materials and Structures, vol. 10, 2001, pp. 850-852.

*Hybrid power for wireless sensors*. By Charles D.E. Lakeman et al., TPL Inc. Albuquerque, New Mexico.

*μPowerChip: Integrated power for Wireless Microsystems*. By Jenniffer DeGreeff et al., TPL Inc. Albuquerque, New Mexico.

* cited by examiner

INSTRUMENTED COMPONENT FOR USE IN AN OPERATING ENVIRONMENT

CROSS REFERENCE TO RELATED APPLICATIONS

This application is a Continuation-In-Part of pending U.S. patent application Ser. No. 11/122,566 filed May 5, 2005, which claims the benefit of U.S. Provisional Patent Application No. 60/581,662 filed Jun. 21, 2004, both of which are specifically incorporated herein by reference in their entirety.

FIELD OF THE INVENTION

The present invention relates generally to monitoring operating environments and in particular to components enabled for transmitting data with respect to the condition of individual components within an operating environment such as a gas turbine engine.

BACKGROUND OF THE INVENTION

Gas combustion turbines are used for a variety of applications such as driving an electric generator in a power generating plant or propelling a ship or an aircraft. Firing temperatures in modern gas turbine engines continue to increase in response to the demand for higher efficiency engines. Superalloy materials have been developed to withstand the corrosive high temperature environment that exists within a gas turbine engine. However, even superalloy materials are not able to withstand extended exposure to the hot combustion gas of a current generation gas turbine engine without some form of cooling and/or thermal insulation.

Thermal barrier coatings are widely used for protecting various hot gas path components of a gas turbine engine. The reliability of such coatings is critical to the overall reliability of the machine. The design limits of such coatings are primarily determined by laboratory data. However, validation of thermal barrier coating behavior when subjected to the stresses and temperatures of the actual gas turbine environment is essential for a better understanding of the coating limitations. Such real world operating environment data is very difficult to obtain, particularly for components that move during the operation of the engine, such as the rotating blades of the turbine.

Despite the extreme sophistication of modern turbine engines, such as gas turbines for generating electrical power or aircraft engines for commercial and military use, designers and operators have very little information regarding the internal status of the turbine engine components during operation. This is due to the harsh operating conditions, which have prevented the use of traditional sensors for collecting reliable information of critical engine components.

Many current turbines are equipped with sensors capable of limited functions such as exhaust gas-path temperature measurements, flame detection and basic turbine operating conditions. Based on this information, turbine operators such as utility companies operate engines in a passive mode, in which maintenance is scheduled based on prior histories of similar engines. Engine rebuilds and routine maintenance are performed in the absence of a prior knowledge of the remaining or already utilized life of individual components. The lack of specific component information makes early failure detection very difficult, often with the consequence of catastrophic engine failure due to abrupt part failure. This results in inefficient utilization, unnecessary downtime and an enormous increase in operating cost.

Currently, the gas turbine industry approach is to depend on the measurement of gas path temperature, which is related back to specific component problems based on experience and history regarding a class of engines. This approach is highly subjective and only allows for determining already severe situations with an engine. It does not provide indications of impending damage or insight into the progression of events leading up to and causing engine damage due to component degradation or failure.

The instrumentation of a component such as a blade or vane within a steam turbine typically includes placing wire leads on the balance wheel, which continue on to the blade airfoil. The wire leads are typically held together by an epoxy. These wires are routed from within the component to the turbine casing. The pressure boundary of a component may be breached to introduce a sensor such as a thermocouple and a braze is back filled to hold the thermocouple in place. Each thermocouple sensor has wire leads coming out of the component that are connected back to a diagnostic unit. Instrumenting a plurality of components of a turbine in this manner results in an extensive network of wires just for monitoring the single operating condition of temperature. Instrumenting components using this technique is expensive, which is a barrier to instrumenting a large number of components within a single turbine. Further, the wire leads and data transfer is frequently poor, which can result in costly repairs and flawed data analysis.

Using thermocouples for temperature measurements in the gas path of a turbine may be disadvantageous because it only provides feedback to an operator that a temperature change has occurred in the gas path. It does not provide any indication as to why the temperature change has occurred. For diagnosing problems with blades or vanes based on a measured temperature change, there has to be an historical correlation between the measured temperature differential and the specific problem, such as a hole in a vane. This correlation is difficult and time consuming to derive to within a reasonable degree of certainty and needs to be done on an engine-by-engine basis taking into account turbine operation conditions. When a temperature differential is measured, it is difficult, if not impossible, to predict what the problem is or where it is located. Consequently, the turbine must typically be shut down and inspected to determine the scope of repair, replacement or other maintenance to be performed.

In any application, combustion turbines are routinely subject to various maintenance procedures as part of their normal operation. Diagnostic monitoring systems for gas turbines commonly include performance monitoring equipment that collects relevant trend and fault data used for diagnostic trending. In diagnostic trend analysis, certain process data (such as exhaust gas temperature, fuel flow, rotor speed and the like) that are indicative of overall gas turbine performance and/or condition are compared to a parametric baseline for the gas turbine. Any divergence of the raw trend data from the parametric baseline may be indicative of a present or future condition that requires maintenance. Such diagnostic monitoring systems can only predict or estimate specific component conditions and do not collect data from or provide any analysis with respect to the actual condition of a specific component itself.

In this respect, conventional methods of predicting component failure for gas turbines and of scheduling maintenance have not been entirely accurate or optimized. The traditional "duty cycle" used for predictive maintenance does not reflect real operational conditions, especially off-design operations. The actual life of specific components of a gas turbine depends strongly on the actual usage of that gas turbine and the specific components within the turbine.

For example, elevated temperatures and stresses within the turbine, and aggressive environmental conditions may cause excessive wear on components in the turbine beyond that predicted with the standard design duty cycle. Off-design operating conditions, which are often experienced by industrial gas turbines, are not reflected by the standard duty cycles. The actual life of components in the gas turbine may be substantially less than that predicted by the design duty cycle. Alternatively, if more favorable conditions are experienced by an actual gas turbine than are reflected in the design duty cycle, the actual component life may last substantially longer than that predicted by maintenance schedules based on the design duty cycle. In either event, the standard design duty cycle model for predicting preventive maintenance does not reliably indicate the actual wear and tear experienced by gas turbine components.

Known techniques for predicting maintenance and component replacement rely on skilled technicians to acquire or interpret data regarding the operation of a combustion turbine. Such techniques are subject to varying interpretations of that data by technicians. Technicians may manually evaluate the operational logs and/or data collected from gas turbines. Technicians, for example, may evaluate start and stop times and power settings to determine how many duty cycles had been experienced by the gas turbine, their frequency, period and other factors. In addition, if the data log of a gas turbine indicated that extraordinary conditions existed, such as excessive temperatures or stresses, the technicians may apply "maintenance factors" to quantify the severity of these off-design operational conditions.

None of these techniques provide accurate information with respect to the actual condition of a specific component or component coating, which may lead to unnecessary repair, replacement or maintenance being performed causing a significant increase in operating costs.

DETAILED DESCRIPTION OF THE INVENTION

Figure 1:
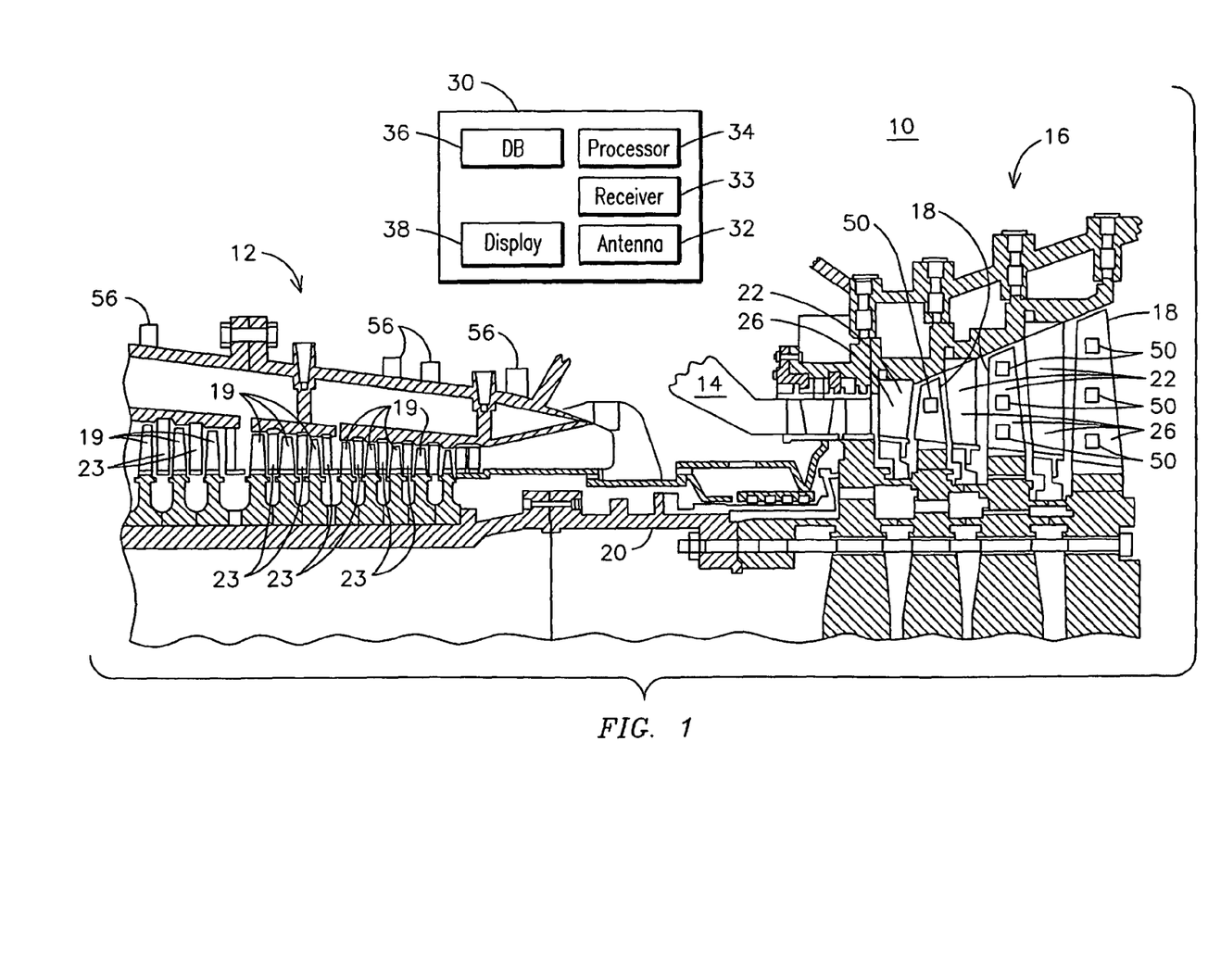
FIG. 1 is a cross sectional view of an exemplary combustion turbine with which embodiments of the invention may be used and an exemplary monitoring and control system for collecting and analyzing component data from the combustion turbine.

FIG. 1 illustrates an exemplary combustion turbine 10 such as a gas turbine used for generating electricity as will be recognized by those skilled in the art. Embodiments of the invention may be used with combustion turbine 10 or in numerous other operating environments and for various purposes as will be recognized by those skilled in the art. For example, embodiments may be used in aircraft engines, monitoring temperature and heat flux in boilers, heat exchangers and exhaust stacks; determining insulation performance and degradation; determining pipe fouling; and evaluating vibrating component health. Embodiments may be used in the automotive industry for monitoring combustion chamber conditions, rotating components such as crankshaft, cams, transmissions and differentials, and determining suspension and frame integrity for heavy-duty vehicles. Embodiments may also be used in measuring strain and heat flux in tanks, portable and other equipment operating in dessert, wet, and/or high temperature configurations.

Returning to FIG. 1, combustion turbine engine 10 includes a compressor 12, at least one combustor 14 (broken away) and a turbine 16. Compressor 12, combustor 14 and turbine 16 are sometimes referred to collectively as a gas or combustion turbine engine. Turbine 16 includes a plurality of rotating blades 18, secured to a rotatable central shaft 20. A plurality of stationary vanes 22 are positioned between blades 18, with vanes 22 being dimensioned and configured to guide air over blades 18. Blades 18 and vanes 22 will typically be made from nickel-cobalt, and may be coated with a thermal barrier coating 26, such as yttria-stabilized zirconia. Similarly, compressor 12 includes a plurality of rotating blades 19 positioned between respective vanes 23.

In use, air is drawn in through compressor 12, where it is compressed and driven towards combustor 14. Combustor 14 mixes the air with fuel and ignites it thereby forming a working gas. This working gas will typically be above about 1300° C. This gas expands through turbine 16, being guided across blades 18 by vanes 22. As the gas passes through turbine 16, it rotates blades 18 and shaft 20, thereby transmitting usable mechanical work through shaft 20. Combustion turbine 10 may also include a cooling system (not shown), dimensioned and configured to supply a coolant, for example steam or compressed air, to blades 18 and vanes 22.

The environment wherein blades 18 and vanes 22 operate is particularly harsh, being subject to high operating temperatures and corrosive atmosphere, which may result in serious deterioration of blades 18 and vanes 22. This is especially likely if the thermal barrier coating 26 should spall or otherwise deteriorate. Embodiments of the invention are advantageous because they allow components to be configured for transmitting data indicative of a component's condition during operation of combustion turbine 10. Blades 18, 19, vanes 22, 23, and coatings 26, for example, may be configured for transmitting component specific data that may be directly monitored to determine the respective condition of each component during operation and to develop predictive maintenance schedules.

FIG. 1 also illustrates a schematic of an exemplary monitoring and control system 30 that may be used in accordance with various aspects of the present invention. System 30 may include an antenna 32, a receiver 33, a processor or CPU 34, a database 36 and a display 38. Processor 34, database 36 and display 38 may be conventional components and antenna 32 and receiver 33 may have performance specifications that are a function of various embodiments of the invention. For example, antenna 32 and receiver 33 may be selected for receiving wireless telemetry data transmitted from a plurality of transmitters deployed in various locations throughout combustion turbine 10 as more fully described below.

Embodiments of the present invention allow for a plurality of sensors to be embedded within the respective coatings of a plurality of components within combustion turbine 10. Alternate embodiments allow for the sensors to be surface mounted or deposited on components, especially those contained in areas where components do not require a barrier coating, such as within compressor 12. Exemplary sensor embodiments may be used to communicate data to system 30 with respect to physical, performance or operating characteristics of a component and/or properties of a component's coating as well as operating parameters of combustion turbine engine 10.

For example, exemplary sensors may be used to detect wear between two components, measure heat flux across a component's coating, detect spalling of a coating, measure strain across an area of a component or determine crack formation within a component or coating. Those skilled in the art will recognize other properties and/or characteristics of a component or component coating that may be measured and/or detected in accordance with aspects of the invention.

It will be appreciated that aspects of the invention allow for various sensor configurations to be embedded within a barrier coating such as a barrier coating 26 of blades 18 or vanes 22 of turbine 16. U.S. Pat. No. 6,838,157, which is specifically incorporated herein by reference, describes various embodiments of methods for instrumenting gas turbine components, such as blades 18 and vanes 22 that may be utilized for depositing sensors in accordance with aspects of the present invention. This patent discloses various methods of forming trenches in a barrier coating, forming a sensor in the coating and depositing a backfill material in the trench over the coating. Embodiments of those methods and components may be used to form smart components as disclosed herein.

U.S. Pat. No. 6,576,861, which is specifically incorporated herein by reference, discloses a method and apparatus that may be used to deposit embodiments of sensors and sensor connectors with transmitters in accordance with aspects of the present invention. In this respect, methods and apparatus disclosed therein may be used for the patterning of fine sensor and/or connector features of between about 100 microns and 500 microns without the need of using masks. Depositing features using conductive materials, resistive materials, dielectric materials, insulative materials and other application specific materials may form multilayer electrical circuits and sensors. It will be appreciated that other methods may be used to deposit multilayer electrical circuits and sensors in accordance with aspects of the invention. For example, thermal spraying, vapor deposition, laser sintering and curing deposits of material sprayed at lower temperatures may be used as well as other suitable techniques recognized by those skilled in the art.

Embodiments of the invention allow for a plurality of sensors 50 to be deployed in numerous places within combustion turbine 10 for monitoring component-specific or coating-specific conditions as well as collecting other data with respect to the operation or performance of combustion turbine 10. For example, FIG. 1 illustrates that one or more sensors 50 may be embedded within respective barrier coatings 26 of one or more blades 18 of turbine 16. It will be appreciated that sensors 50 may be embedded within barrier coatings of other components with turbine 16 for which component-specific and/or coating-specific data is to be acquired.

Figures 2, 3:
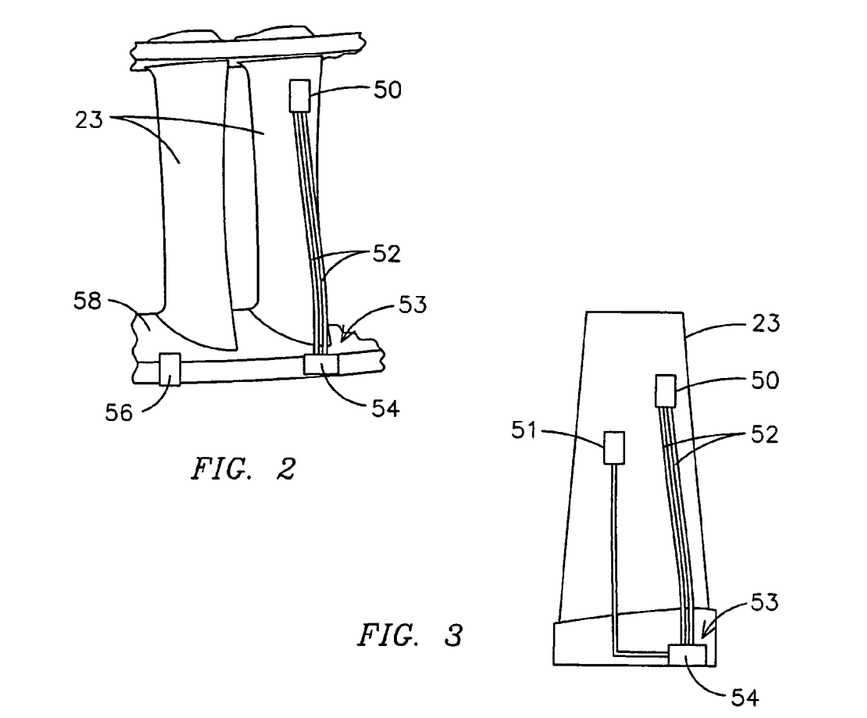
FIG. 2 a perspective view of an exemplary combustion turbine vane equipped with an exemplary embodiment of the present invention.
FIG. 3 is a schematic view of a vane of FIG. 2.

FIG. 2 illustrates a pair of vanes 23 removed from compressor 12 with one vane having a sensor 50 mounted or connected with vane 23 for detecting a condition of vane 23. A connector 52 may be provided as a means for routing a data signal from sensor 50 to a transmitter 54 configured for wirelessly transmitting the data signal to a transceiver 56. Connector 52 may be one or a plurality of electrical leads for conducting a signal from sensor 50 to a surface mounted transmitter 54. Alternate embodiments allow for various types of connectors 52 to be used as a means for routing a data signal from sensor 50 to transmitter 54, depending on the specific application. For example, one or a plurality of fiber optic connectors may be used for routing a signal using single or varying wavelengths of light.

Embodiments allow for transmitters 54 to be multi-channel and have various specifications depending on their location within a casing of combustion turbine 10. Transmitters 54 may be configured to function within the early stages of compressor 12, which are subject to operating temperatures of between about 80° C. to 120° C. Transmitters 54 may be configured to function within later stages of compressor 12 and/or any stages of turbine 16, subject to operating temperatures of greater than about 120° C., and even temperatures greater than 250° C., and be resistant to oxidative exposure. It will be appreciated that high temperature capable electronic materials may be employed for fabricating transmitters 54 operating in regions with temperatures greater than about 120° C.

FIG. 3 illustrates a schematic plan view of compressor vane 23 having sensor 50 connected therewith and connector 52 connecting sensor 50 with transmitter 54. A power source 51 may be provided, such as an appropriately sized battery for powering transmitter 54. In alternate embodiments transmitter 54 may be located remotely from vane 23 and powered from an external power source. Transmitter 54 may receive signals from sensor 50 via connector 52 that are subsequently wirelessly transmitted to transceiver 56. Transceiver 56 may be mounted on hub 58 or on a surface external to compressor 12 such as the exemplary locations shown in FIG. 1. Transceiver 56 may be mounted in various locations provided it is within sufficient proximity to transmitter 54 to receive a wireless data transmission, such as an RF signal from transmitter 54. Transceiver 56 may transmit the RF signal to antenna 32 of system 30 where the signal may be processed for monitoring the condition of compressor vane 23.

With respect to FIGS. 2 and 3, one or more sensors 50 may be connected with one or more compressor vanes 23 by fabricating sensor 50 directly onto a surface of vane 23. Connector 52 may be deposited directly onto a surface of vane 23. In alternate embodiments a trench or recess may be formed within a surface of vane 23 that is sized for receiving a deposited sensor 50 and connector 52. Sensor 50 and connector 52 may be deposited within the recess and protected by depositing a coating of suitable material onto a surface of vane 23 over sensor 50 and connector 52.

In other alternate embodiments a coating may be deposited onto a surface of vane 23, a trench may be formed within the coating and sensor 50 and connector 52 may be deposited within the trench. A protective coating may be deposited over sensor 50 and/or connector 52. Connector 52 may extend from sensor 50 to a termination location, such as the peripheral edge of vane 23 so that a distal end 53 of connector 52 is exposed for connection to transmitter 54. Sensor 50 and connector 52 may be positioned on vane 23 to minimize any adverse affect on the aerodynamics of vane 23.

Figure 4:
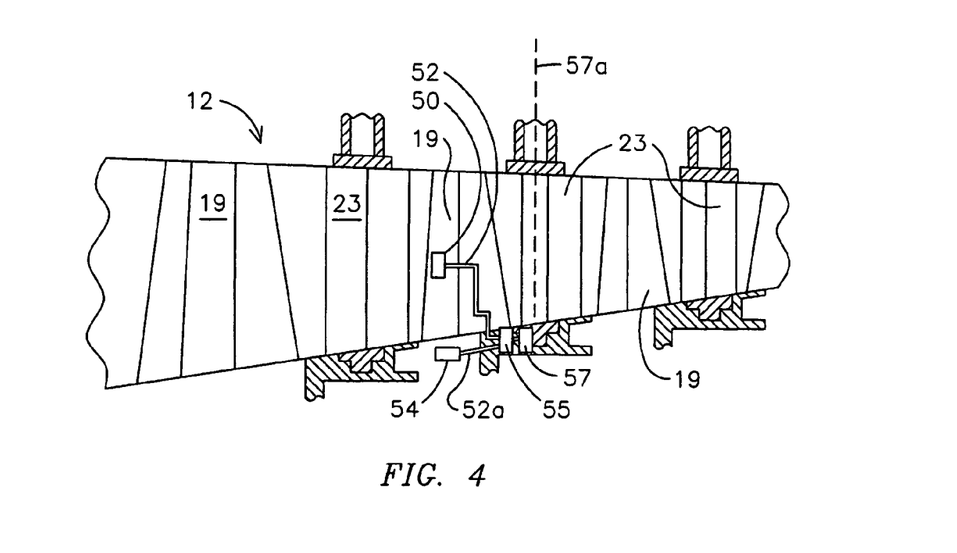
FIG. 4 is a schematic cross section of the compressor of FIG. 1.

One or more sensors 50, such as strain gauges or thermocouples, for example, may be deposited on one or more turbine or compressor blades 18, 19. FIG. 4 illustrates an embodiment with respect to compressor 12. A connector 52 may be deposited to connect each sensor 50 to one or more transmitters 54 connected with blade 18, 19. Exemplary embodiments allow for a plurality of sensors 50 to be connected with a single transmitter 54 via respective connectors 52. For example, a sensor 50 may be deposited on each of a plurality of blades 18, 19. A connector 52 may be deposited to route a signal from each sensor 50 to a single transmitter 54.

Transmitter 54 and a rotating antenna 55 may be mounted proximate the root of blade 18, 19. Connector 52 may be routed from sensor 50 aft to the root of blade 18, 19 to connect sensor 50 with rotating antenna 55, which may in turn be connected with transmitter 54 via a connector 52a. A stationary antenna 57 may be installed on a turbine or compressor vane 22, 23 aft of the root of respective blade 18, 19. A lead wire 57a may be routed from stationary antenna 57 out of compressor 12 or turbine 16 to broadcast a signal to system 30. In exemplary embodiments, such as that shown in FIG. 4, power may be generated through induction during operation of compressor 12 as will be appreciated by those skilled in the art. In this arrangement, transmitter 54 may transmit data to stationary antenna 57 via rotating antenna 55 and power may be supplied from stationary antenna 57 to transmitter 54.

One or more sensors 50 may be mounted to, such as by a spray deposition, each compressor blade 19 within a row of blades 19 mounted on a disk within compressor 12. A respective connector 52 may connect each sensor 50 to a respective transmitter 54 mounted proximate the root of each blade 19 within the row. Rotating antenna 55 may encircle the disk proximate the root of each blade 19 and be connected with each transmitter 54 via a respective connector 52a. One or more stationary antennas 57 may be installed on a compressor vane 23 aft of the row of compressor blades 19, or in another location, such as a compressor hub sufficiently proximate to rotating antenna 55 for signal broadcasting and receiving. Stationary antenna 57 may also encircle the row of blades 19. Rows of blades 18 in turbine 16 may be similarly configured.

Figure 5:
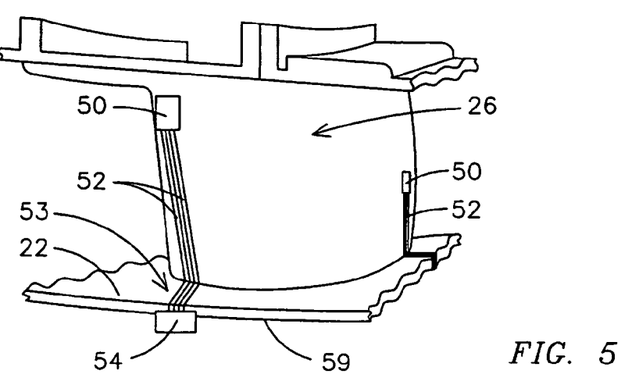
FIG. 5 is a perspective partial view of an exemplary embodiment of a component that may be used within the combustion turbine of FIG. 1.

FIG. 5 illustrates a partial view of a component, such as a vane 22 from turbine 16 having a barrier coating 26 deposited thereon. Sensor 50 and connector 52 may be embedded beneath an upper surface of barrier coating 26. Connector 52 may have a distal end 53 that is exposed at a termination location, such as proximate a peripheral edge 59 of vane 22 for connection with transmitter 54. In an embodiment transmitter 54 may be surface mounted to vane 22 or embedded within coating 26 proximate peripheral edge 59. Alternate embodiments allow for transmitter 54 to be located elsewhere such as on a platform (not shown) to which vane 22 is connected or in a cooling flow channel, for example, as will be recognized by those skilled in the art.

Figure 6A:
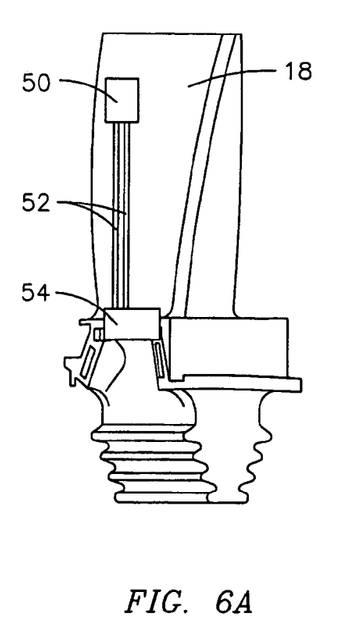
FIG. 6A is a schematic of an exemplary embodiment of the component of FIG. 5.
Figure 6B:
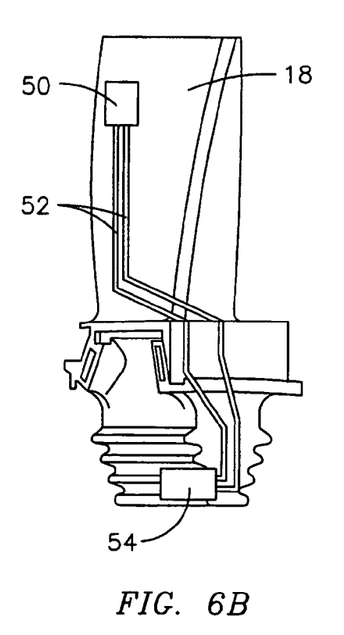
FIG. 6B is a schematic of an exemplary embodiment of the component of FIG. 5.
Figure 6C:
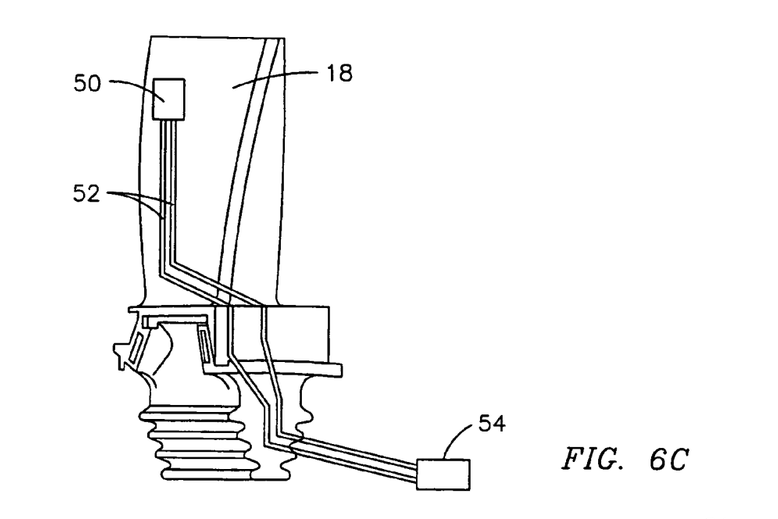
FIG. 6C is a schematic of an exemplary embodiment of the component of FIG. 5.

FIG. 6A illustrates a schematic plan view of a blade 18 having an exemplary sensor 50 connected therewith and connector 52 connecting sensor 50 with transmitter 54. Transmitter 54 may be powered through induction generated within turbine 16 during operation of combustion turbine 10. FIGS. 6A, 6B and 6C illustrate exemplary embodiments of a turbine blade 18 having transmitter 54 placed in various locations. In FIGS. 6A and 6B transmitter 54 may be mounted to blade 18 and FIG. 5C illustrates that transmitter 54 may be located remote from blade 18.

For example, transmitter 54 may be located remotely from blade 18 such as within a disk (not shown) to which a plurality of blades 18 is attached. In this respect, transmitter 54 may be maintained in a cooler location outside the hot gas path, which may increase the transmitter's useful life. Locating transmitter 54 remote from blade 18 allows for using an external power source for powering transmitter 54 rather than using a battery or induction. A power supply may also be attached to sensor 50 to provide additional functionality to the sensor. This additional functionality could include mechanical actuation as a result of feedback responsive to output from sensor 50. Such an integrated system may be applicable for components, such as ring segments for real-time gap control.

The exemplary embodiments of compressor vane 23 and turbine blade 18 illustrated in FIGS. 3-6A, 6B and 6C configured with self-contained sensors 50 and connectors 52 are advantageous in that they may be prefabricated for installation in combustion turbine 10 by a field technician. Embodiments allow for a distal end 53 of connectors 52 to be exposed at a termination location. This location may be proximate a peripheral edge of a component or other location. This allows a field technician to quickly and easily connect connector 52 to a transmitter 54 regardless of its location.

Providing components of combustion turbine 10, such as vanes 23 and/or blades 18 with pre-installed sensors 50 and connectors 52 is a significant advantage over previous techniques for installing such components in the field, which typically required an extensive array of wires to be routed within combustion turbine 16. Providing components with pre-installed sensors 50 and connectors 52 allows for monitoring the condition of those specific components during operation of combustion turbine 10.

Embodiments of the invention allow for sensor 50 to be configured to perform a wide range of functions. For example, sensor 50 may be configured to detect wear of a single component or between two components, measure heat flux across a component's coating, detect spalling of a coating, measure strain across an area of a component or determine crack formation within a component or coating. U.S. patent application having application Ser. No. 11/018,816, which is specifically incorporated herein by reference, discloses embodiments of a system that generally involves monitoring the wear of a component that may be configured in accordance with embodiments of the present invention.

Wear sensors 50 may be configured as embedded electrical circuits in a contact surface of a component, such as a tip of blade 18 and the circuit may be monitored by monitoring system 30 for indications of wear. By positioning a circuit at the wear limit, or at prescribed depths from the component's surface, the condition of the surface may be continuously monitored and system 30 may provide an operator with an advanced warning of service requirements.

Sensor 50 may be configured for wear detection and prefabricated within a component for use within combustion turbine 10 either alone or in combination with a means for transmitting 54 in accordance with aspects of the present invention. In this respect, the signals extracted for detection of wear may be conducted via connectors 52 to transmitter 54, which may transmit the signals via wireless telemetry to a transceiver 56 and subsequently system 30.

Embodiments of the present invention allow for monitoring and control system 30 to collect and store historical data with respect to a component's wear and correlating the component's wear with the operating conditions of combustion turbine 10 responsible for producing the wear. This may be accomplished by continuously interrogating turbine 16 conditions, for example, by the deposition of piezoelectric devices and/or other sensors 50 configured for providing a continuous data stream indicative of the loading conditions and vibration frequency experienced by various components within turbine 16. This data may be correlated to data indicative of a component's wear and used for predictive maintenance or other corrective actions.

Figure 7:
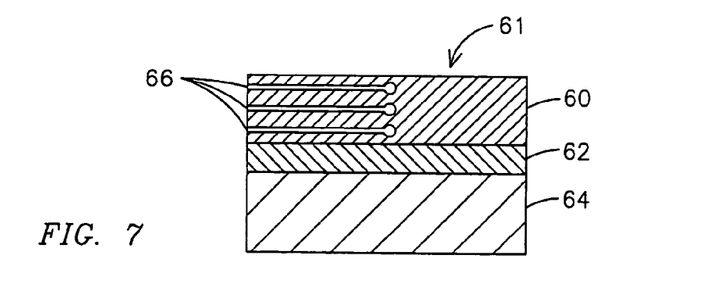
FIG. 7 is an exemplary embodiment of a heat flux sensor.

FIG. 7 illustrates another exemplary embodiment of a sensor 50 that may be configured as an exemplary heat flux sensor 61 for measuring heat flux across a barrier coating such as a thermal barrier coating (TBC) 60, which may be yttrium-stabilized zirconium. Using known techniques, thermal barrier coating 60 may be deposited on a bond coat 62, which may be deposited on a substrate 64. Substrate 64 may be various components such as a superalloy suitable for use in turbine 16, and in an embodiment may a blade 18. The heat flux may be used to obtain the surface temperature of substrate 64 without having to expose the surface of substrate 64 to the surface temperature experienced by the upper surface of thermal barrier coating 60.

Thermocouples 66 may comprise a material having a coefficient of thermal expansion that substantially matches that of the material within which they are deposited, such as thermal barrier coating 60. In an embodiment, a plurality of temperature sensors, such as K-type thermocouples 66 may be embedded within a thermal barrier coating 60 with thermocouples 66 located vertically over each other as shown in FIG. 6. In an embodiment, thermocouples 66 may include a NiCr/NiAl thermocouple junction. Alternate embodiments allow for thermocouples 66 to be fabricated of other materials such as Pt and Pt—Rh for high temperature applications such as those within turbine 16.

Heat flux sensor 61 may be formed in different geometries to achieve a desired signal-to-noise ratio. Each thermocouple 66 may be approximately 25 microns thick but this thickness may vary depending on the application. Because the thermal barrier coating 60 may be several times as thick as thermocouples 66 they will not significantly alter the profile or performance of thermal barrier coating 60. Embodiments allow for post deposition laser micromachining to achieve a desired junction density.

As heat flows vertically into or out of thermal barrier coating 60, each thermocouple 66 will record a different temperature measurement. Measuring the temperature differences and knowing the thickness and thermal conductivity of thermal barrier coating 60 can obtain the heat flux. Thermocouples 66 may be connected with a means for transmitting 52 as described herein so that the respective temperature measurements taken by each thermocouple 66 may be wirelessly transmitted to monitoring and control system 30.

Figure 8:
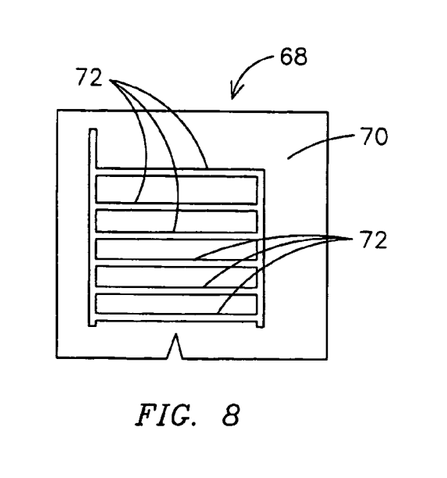
FIGS. 8 and 9 illustrate an exemplary embodiment of a strain gauge and a crack propagating to different lengths.
Figure 9:
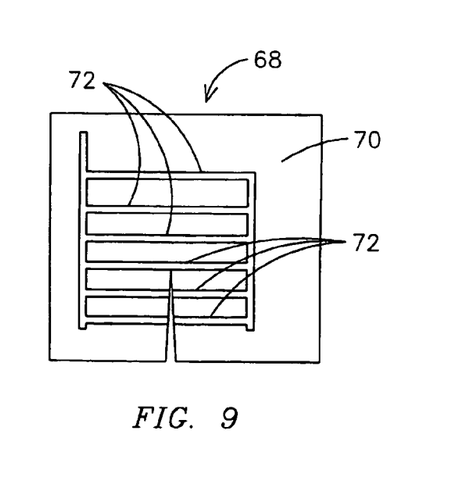

FIGS. 8 and 9 illustrate an exemplary embodiment of a sensor 50 that may be configured as an exemplary sensor 68 configured for detecting and/or measuring strain or a crack within a location of interest such as substrate 70. For example, substrate 70 may be a location of interest of a surface area of a blade 18, or it may be other locations of interest within or at the surface of thermal barrier coating 60 or bond coat 62. It will be appreciated that sensor 68 configured in this manner may be used in numerous places throughout combustion turbine 10. The sensors described in FIGS. 8 and 9 describe the utilization of the change in resistance to result in a strain output. Other embodiments of strain gauges could also include capacitive changes to determine the local strain values.

In this respect, critical engineering components, such as blades 18, 19 and vanes 22, 23 are nearly universally subjected to some form of mechanical and/or thermo-mechanical cyclic loading. Aspects of the invention allow for the assessment of component service life by the intermittent or continuous, in-situ measurement of applied strains and crack detection with respect to that component. This may be accomplished by the placement of embedded strain gages and crack sensors 68 in various locations within combustion turbine 10. Sensors 50 configured as a strain gauge 68 may be formed using a NiCr material for use in lower temperature applications, such as in compressor 12 of combustion turbine 10.

Sensors 68 may be used as crack sensors by placing them at locations or points where cracks are known or likely to appear. A crack sensor gauge 68 may be optimized for size, crack propagation, and crack extent through appropriate choice of gauge 68 parameters. Such parameters may include the footprint of gauge 68, spacing of fingers 72, and orientation of fingers 72 with respect to the direction of a predicted crack propagation. Crack formation in substrate 70 gives rise to a large, abrupt change in the strain gauge response, and may be detected by continuously monitoring the sensor 68 output for abrupt signal changes using known signal processing techniques. Data indicative of the signal change may be conducted via a means for transmitting 54 to a transceiver 56 and subsequently transmitted to monitoring and control system 30 via wireless telemetry.

Strain gauge sensor 68 may be bonded to or deposited on a surface of a compressor blade 19 and positioned so that bending stress on blade 19 varies the output signal from sensor 68. Connector 52, which may be wire leads, are routed to a transmitter 54 located on a rotating collar internal to compressor 12. Transmitter 54 may have an onboard bridge completion and provide a regulated voltage to sensor 68. As the output signal from sensor 68 varies an RF signal from transmitter 54 varies proportionally. The RF signal may be transmitted to a transceiver 56, which receives the RF signal and converts it into a voltage signal proportional to the strain detected by sensor 68. The RF signal may be transmitted to system 30. An exemplary transmitter 54 may pick up changes in strain from about 30 Hz to about 30 KHz.

Embodiments of the invention allow for using crack sensors 68 to monitor crack growth during operation of combustion turbine 10 and verify design models by varying component operating parameters until cracks are detected with the crack sensors 68. The design models will be calculated for the same operating parameters to see if they successfully predict crack growth and formation, and will be modified accordingly.

Monitoring and control system 30 may collect and store data indicative of strain and crack measurements from numerous components in critical locations within combustion turbine 10, such as blades 18, for example. Such data may be analyzed over time to develop a strain history for each component. A component's strain history may include the magnitude and orientation of strains, and the occurrence of overloads under cyclic loading. An appraisal of fatigue damage may be developed and used for predictive maintenance.

Embodiments of the present invention allow for deploying a plurality of sensors 50 throughout combustion turbine 10 by either surface mounting them to components or embedding them within respective component barrier coatings to collect specific component condition data and transmit that data using wireless telemetry to monitoring and control system 30. This approach is advantageous in that it allows for the replacement, repair and maintenance decision-making processes to be based on the condition of specific components during operation of combustion turbine 10.

In this respect, specific component condition data may be received by antenna 32 and receiver 33 then stored in database 36 by CPU 34. Embodiments allow for specific component condition data to be collected and presented to an operator in real time via display 38. This allows for an operator to make instantaneous decisions regarding the operation of combustion turbine 10 in response to the condition of a specific component or components.

Historical data may be compiled and analyzed with respect to each component for making repair, replacement or maintenance decisions with respect to that component. Operating conditions and specific components of combustion turbine 12 may be monitored sets of conditions may be isolated that are indicative of a component or components needing to be repaired or replaced, or of corrective action to be taken with respect to operation of the gas turbine. These aspects allow for significant improvement in predictive maintenance schedules.

Figure 10:
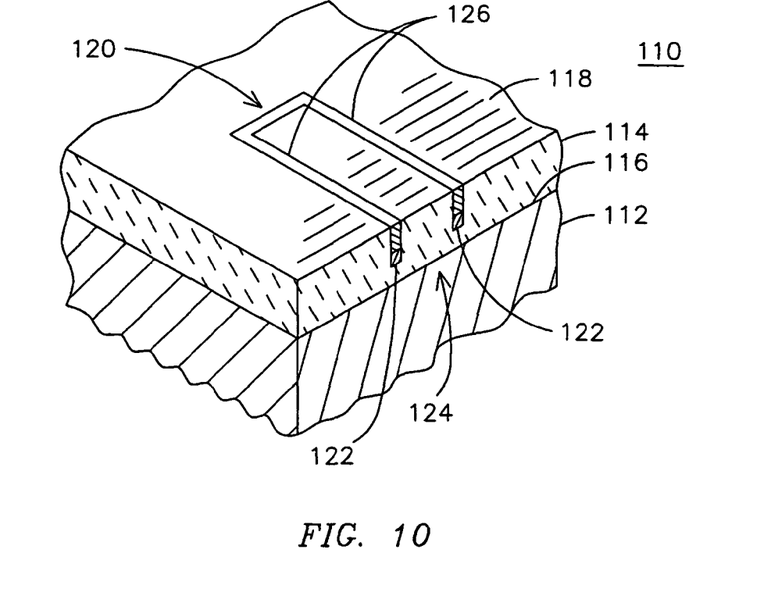
FIG. 10 is a partial perspective view of a component having a sensor embedded within a layer of thermal barrier coating material disposed over a substrate material.

FIG. 10 is a partial perspective illustration of a component 110 formed of a substrate material 112 having a barrier coating such as a layer of thermal barrier coating 114 disposed on one surface 116. The component 110 may be part of a gas turbine engine 10 of FIG. 1, for example, or any other machine wherein a base material must be protected from an external environment by a layer of a barrier material. In an embodiment, component 110 may be an airfoil member, such as a turbine blade 18 disposed in the hot gas flow path of a engine 10 with an oxide or non-oxide ceramic TBC 14 such as mullite, silicon carbide or a zirconium-based ceramic overlying a superalloy substrate material 112.

Component 110 may alternatively be fabricated from a ceramic matrix composite (CMC) substrate coated with an environmental barrier coating (EBC) or a thermal barrier coating (TBC). Because the integrity of the coating 114 is critical to the overall integrity of the component 110, it is useful to obtain operating parameter information that directly affects the performance of the coating 114. Such information is obtained by embedding a sensor, such as a sensor 50 below the exposed surface 118 of the TBC 114. The sensor is not visible in FIG. 10 but may be located below surface 118 in the sensing location indicated generally by numeral 120.

The sensor may be one that provides a signal indicative of temperature, strain, crack initiation, chemical changes, vibration, pressure or other parameters of interest. These sensors themselves could be multi-layered containing a combination of electrodes and the functional body. Conductors 122 may also be located below surface 118 may route the signal produced by the sensor away from sensing location 120 to a termination location, which may be a connection location indicated generally by numeral 224 where they can conveniently exit the component 110. Conductors 122 may function similarly to connectors 52 for routing a signal from a sensor, such as a sensor 50 to a transmitter 54 for transmission to system 30 via wireless telemetry. The sensor and the conductors 122 may be insulated from the surrounding environment by a layer of insulating material 126.

Figure 11:
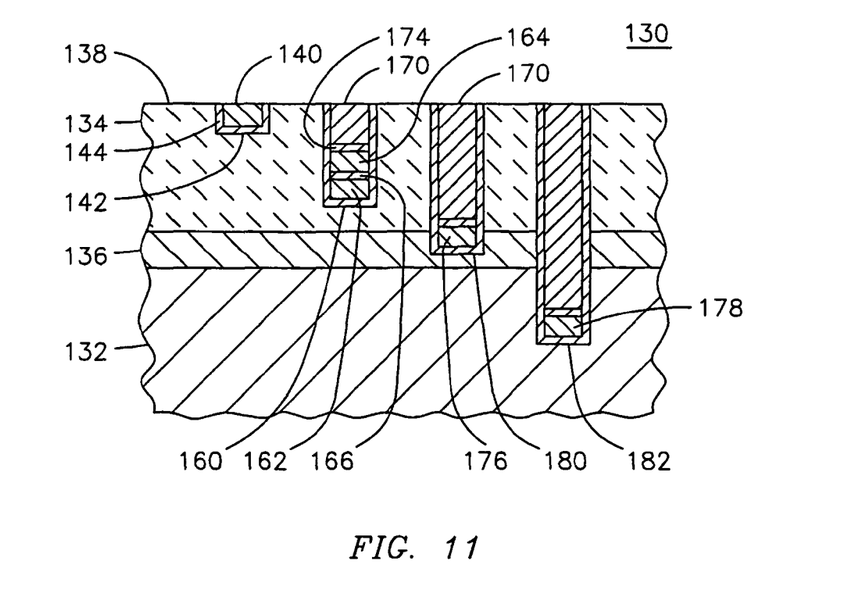
FIG. 11 is a partial cross-sectional view of a component having a plurality of sensors embedded at varying depths below a surface of the component.

FIG. 11 is a partial cross-sectional view of another component 130 having a substrate material 132 covered by a barrier coating such as a layer of a thermal barrier coating material 134 for use in a very high temperature environment. As is well known in the art of TBC coatings, a bond coat 136 such as an MCrAlY material may be deposited on the substrate 132 prior to the application of the TBC material 134 to improve the adherence of the coating 134 to the substrate 132.

Component 130 may be instrumented by a plurality of sensors, such as sensors 50 embedded at a plurality of depths below a surface 138 of the TBC material 134 that is exposed to the external environment. A first sensor 140 is deposited in a relatively shallow trench 142. Trench 142 may be lined with an electrically insulating coating 144 such as aluminum oxide to prevent the grounding of sensor 140 to the TBC material 134. Sensor 140 may take any form known in the art, for example a thermocouple formed by a bi-metallic thermocouple junction or other sensors described herein. The surface location of sensor 140 suggests that it may be useful for sensing a parameter related to the external environment, such as temperature or a chemical parameter.

Figure 12:
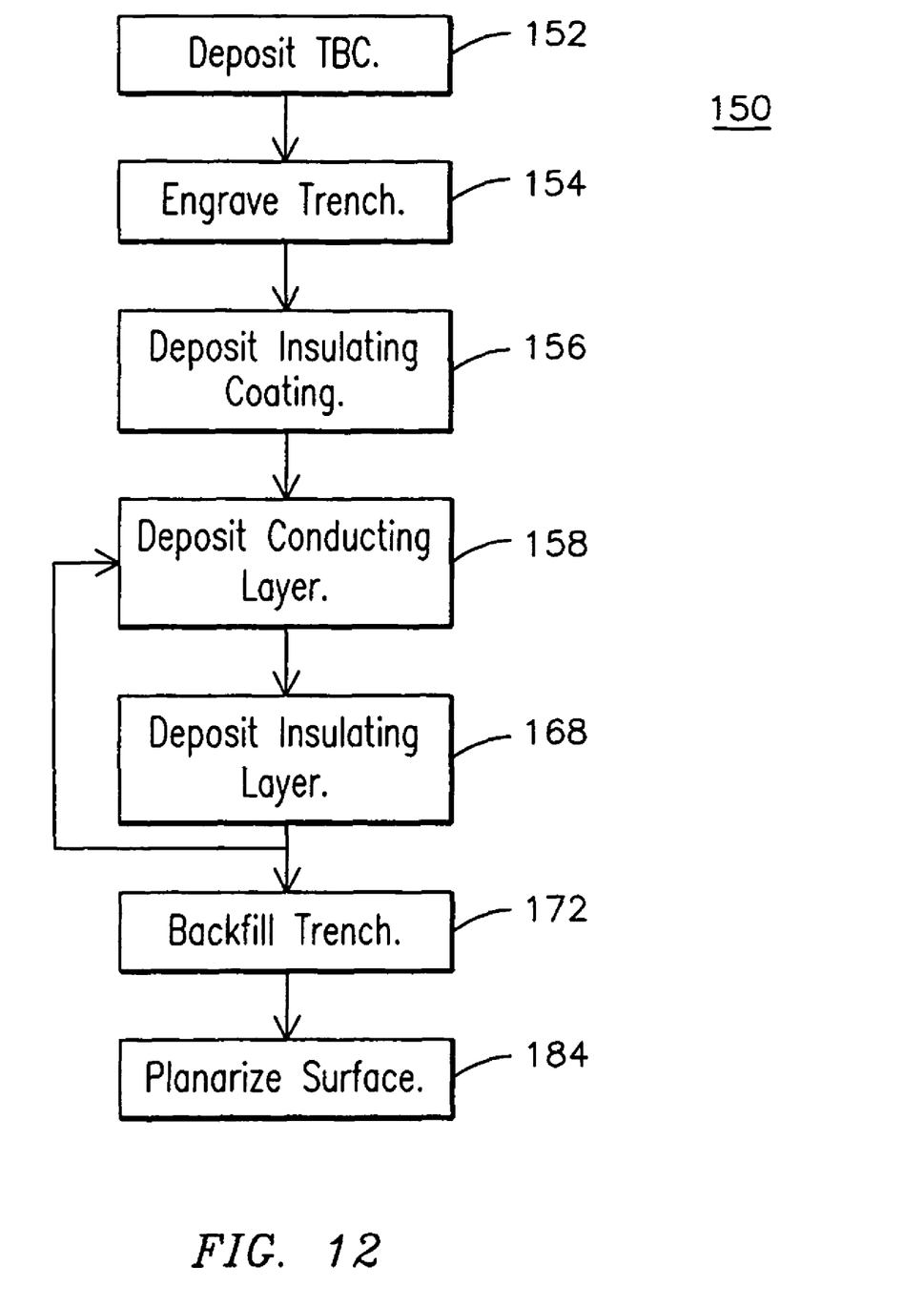
FIG. 12 is a process diagram illustrating steps in a method of manufacturing the component of FIG. 11.

FIG. 12 illustrates the steps of a process 150 that may be used during the manufacturing of the component 130 of FIG. 11. In step 152, a layer of thermal barrier coating material 134 may be deposited onto a substrate 132. After step 152, the component is completed in its normal operating shape as it may be used without embedded instrumentation. One skilled in the art may appreciate, therefore, that the process 150 may be applied to newly fabricated components or it may be back fit to an existing component that is in inventory or that has been in service.

In step 154, a trench 142 may be formed in a surface 138 of the component 130. Trench 142 may be formed to any desired shape by any known method, such as by laser engraving trench 142 to have a generally rectangular cross-section with a predetermined width and depth. Variables for such a laser engraving process include spot size, power level, energy density, pulse frequency, and scan speed. These variables together affect the trench width, depth, material removal rate and the cost of manufacturing. Trench 142 may have a constant cross-sectional size and shape along its entire length, or it may vary in size and/or shape from one region to another.

For example, in the component 110 of FIG. 10, a trench formed in the sensing location 120 may have different dimensions than the trench extending from the sensing location 120 to the connecting location 124, since the sensor and the conductors 122 may have different geometries. The trench 142 may also be inclined to the surface, i.e. varying in depth along its length, which in some applications may provide improved mechanical integrity within the component.

After trench 142 is formed at step 154, an insulating coating 144 may be applied to the surfaces of the trench 142 at step 56 in order to provide electrical isolation between sensor 140 and TBC material 134. Insulating coating 144 may be deposited by any known method such as chemical vapor deposition (CVD) to a thickness sufficient to achieve a desired level of electrical isolation. Once the trench 142 is formed at step 154 and insulated at step 156, depositing the appropriate material or materials into trench 142 at step 158 may form the sensor 140. Any known material deposition process providing the desired material properties may be used. Such processes are common in the fields of rapid prototyping, thin and thick film deposition, and thermal spraying, and include, for example, chemical vapor deposition, plasma spray, micro-plasma spray, cold spray, electroplating, electrophoretic deposition, HVOF, sputtering, CCVD, sol-gel and selective laser melting. Processes typically used for the fabrication of multi-layer thick film capacitors may also be used, such as the application of pastes and tapes of the desired materials.

After the deposition of material, a heat input may be used to sinter the material, thereby increasing the mechanical integrity of the sensor. This can be done either by heating using a flame, plasma, and furnace annealing or localized laser energy application. In the selective laser melting (SLM) process, powdered material having a predetermined chemistry may be deposited into the trench and melted with the energy of a laser beam to form the respective portion of the sensor 140 of FIG. 11 or the interconnecting conductors 122 of FIG. 10. For example, to form a thermocouple, platinum powder may be deposited into one portion of trench 142 and solidified by a SLM process. Platinum-rhodium powder may then be deposited into a second portion of trench 142, either along the trench length or as a second vertical layer, and solidified by a SLM process to contact the platinum material to form the thermocouple junction.

Note that the geometry of trench 142 may have a direct effect on the geometry of the sensor 140. Accordingly, it is possible to affect the operating parameters of sensor 140 or interconnecting conductors 122 by controlling the dimensions of the respective trench 142. For example, the resistance of a conducting line formed within a trench will be affected by the width of the trench. The laser engraving process of step 154 may be closely controlled to achieve a desired trench geometry. Certain commercially available processes for depositing a conductor onto a flat surface by thermal spraying may not produce the fine features that may be necessary for sensors and conductive lines. Such processes may rely on a subsequent material ablation process to achieve a desired geometry. Because trench 142 provides control of the width of the feature, no such trimming step is needed in the process 150 of FIG. 12.

FIG. 11 also illustrates a second trench 160 formed in the TBC material 134 to a second depth that is farther below surface 138 than trench 142. By forming a plurality of trenches 142, 160 at a plurality of depths below surface 138, it is possible to place sensors, such as sensors 50 at more than one depth within the component 130, thereby further augmenting the available operating parameter data. In the embodiment of FIG. 11, trench 160 contains two vertically stacked conducting layers 162, 164 separated by an insulating layer 166. The conducting layers 162, 164 may form two portions of a sensor, or two conducting lines for connecting a sensor to a connecting location. As illustrated in FIG. 12, first depositing conducting layer 162 at step 158, and then depositing an insulating layer 166 at step 168 using any desired deposition technique, such as CVD, may form the two conducting layers 162, 164.

Steps 158, 168 are then repeated to deposit conducting layer 164 and insulating layer 174. The width of these layers is controlled by the width of trench 160 and the thickness of these layers may be controlled as they are deposited to achieve predetermined performance characteristics. For example, the thickness of insulating material 166 will affect the impedance between the two conducting layers 162, 164. Conducting layer 164 is then isolated from the external environment by backfilling the trench 160 with a barrier material such as thermally insulating material 170 at step 172. Insulating material 170 may be the same material as TBC material 134 or a different material having desired characteristics. Insulating material 170 may be deposited by any known deposition technique, including CVD, thermal spraying, selective laser melting, or selective laser sintering. Selective laser melting and selective laser sintering processes are known in the art, as exemplified by Chapters 6 and 7 of "Laser-Induced Materials and Processes For Rapid Prototyping" by L. Lu, J. Y. H. Fuh, and Y. S. Wong, published by Kluwer Academic Publishers.

Additional sensors 176, 178 may be disposed at preselected depths within component 130 by forming respective trenches 180, 182 to appropriate depths. Trenches 180, 182 may be backfilled with insulating material 170 to the level of surface 138 at step 172. Planarization of surface 138 may be performed at step 184, if necessary, such as when surface 138 forms part of an airfoil. By forming a trench to a desired depth, a sensor may be embedded to within the TBC material layer 134, to within the bond coat material layer 136, to within the substrate material 132, or to a depth of an interface between any two of these layers.

Thus, it is possible to develop actual operating parameter data across a depth of a component or across the depth of the thermal barrier coating. Such data may be useful for confirming design assumptions and for updating computerized models, and it may also be useful as an indicator of damage or degradation of a TBC coating. For example, a sensor 178 embedded below the TBC material 134 may produce a signal indicating a significant temperature rise in the event of cracking or spalling of the layer of TBC material 134. Alternatively, the detection of a predetermined level of vanadium, sodium or sulfur deposits by an embedded sensor 176 may announce conditions that would give rise to spalling and failure of the TBC coating 134 if the component were to remain in service for an extended period. This process facilitates the placement of sensors at any location on a fully assembled and coated part. Electrochemical sensors on the component surface can play an important role in determining the nature and effect of corrosion products present in the surrounding environment.

Figures 13, 14, 15, 16:
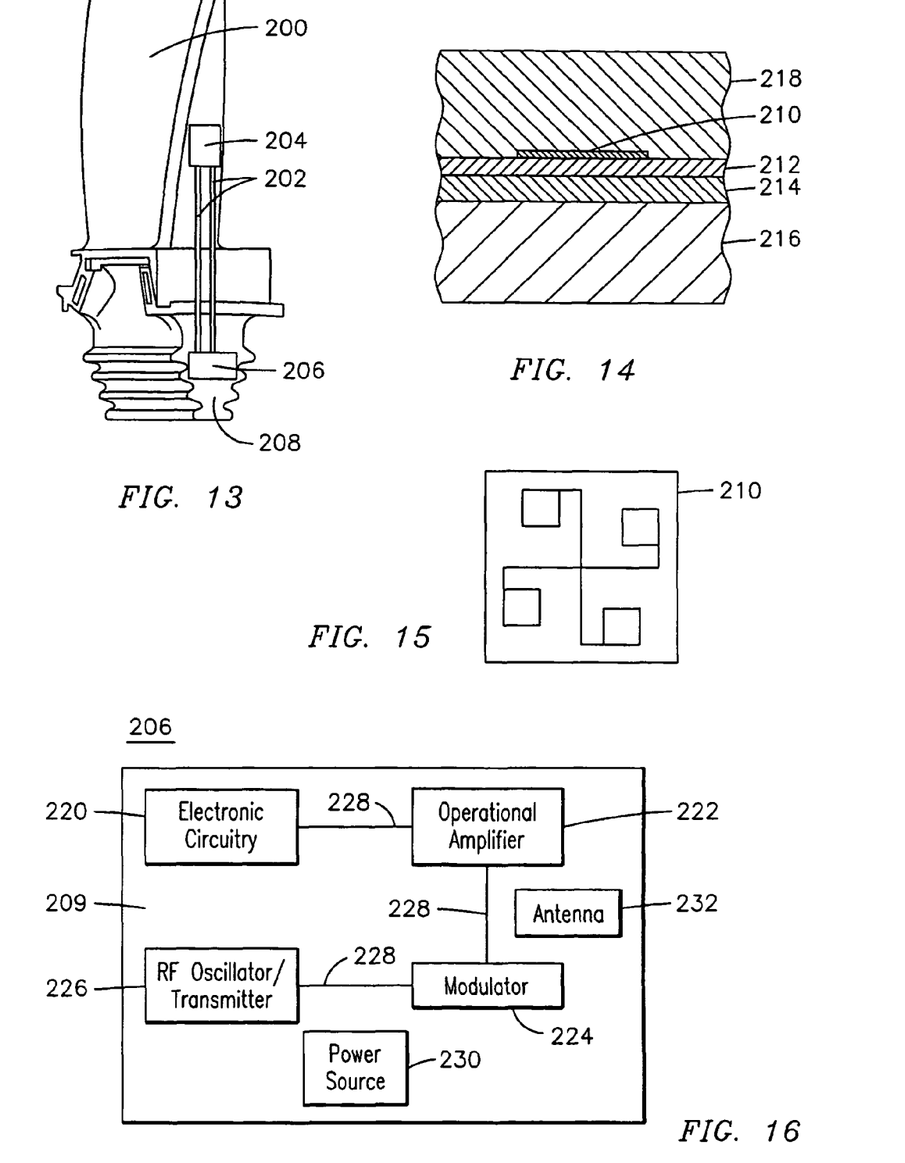
FIG. 13 is a schematic view of an exemplary embodiment of a component instrumented with an exemplary sensor and wireless telemetry device.
FIG. 14 is a partial cross-sectional view of a component having an exemplary coating system and sensor deposited thereon.
FIG. 15 is a plan view of a representative configuration of a strain gage sensor.
FIG. 16 is a schematic plan view of an exemplary electroceramic chip.

Embodiments of the invention allow for components within combustion turbine 10, such as blades 18, 19 and/or vanes 22, 23 to have application specific sensors 50 deposited to conform to a component's surface and/or embedded within a barrier or other coating deposited within combustion turbine 10. For example, FIG. 13 shows an exemplary blade 200, which may be a blade from row 1 of turbine 16, having high temperature resistant lead wires, such as connectors 202 deposited to connect an embedded or surface mounted sensor 204 with a wireless telemetry device 206. It will be appreciated that various embodiments of the invention may be designed for use with any row of blades 18, 19 and/or vanes 22, 23 within combustor 12 or turbine 16.

Sensor 204 may be deposited using novel ceramic materials suitable for use in the hot gas path section of combustion turbine 16 where operating temperatures may exceed 1100° C. Wireless telemetry device 206 may be mounted in a location where the telemetry components are exposed to relatively lower temperatures, such as proximate the root 208 of blade 200 where the operating temperature is typically greater than about 250° C. and less than about 700° C. Blade 200 and root 208 may be referred to unitarily as a substrate.

Silicon-based electronic semiconductors, such as those that may be used for transmitting data may have limited applications due to their operational temperature constraints. Temperature and performance properties of silicon and silicon-on-insulator (SOI) electronic chip technologies may limit their applications to operating environments of less than about 200° C. Aspects of the invention allow for such electronic systems to be deployed for wireless telemetry within compressor 12, which typically has an operating temperature of about 100-150° C. Embodiments of wireless telemetry sensor systems may be configured to operate within higher temperature regions present in later stages of compressor 12, and turbine 16. These regions may have operating temperatures of about 150-250° C. in the later parts of the compressor section and between 250-700° C. in the turbine section. Materials having temperature and electrical properties capable of operation in these higher temperature regions may be used for depositing sensors 50, 204, connectors 52, 202 and fabricating wireless telemetry devices 206.

Referencing FIG. 13, instrumenting blades 200 of turbine 16 with one or more high-temperature-capable sensors 204, respective interconnects 202 and one or more wireless telemetry devices 206 enables collection of real-time performance data indicative of various operating parameters or conditions of components and/or coatings within turbine 16. Exemplary turbine blade 200 may have at least one sensor 204 deposited on a surface of the blade and/or embedded within a barrier coating deposited thereon, such as a thermal barrier coating 26. At least one wireless telemetry device 206 may be affixed proximate root 208 of blade 200.

Sensors 204 and high temperature interconnect lines or connectors 202 may be deposited using known deposition processes such as plasma spraying, EB PVD, CVD, pulsed laser deposition, mini-plasma, direct-write, mini-HVOF, cold spray or solution plasma spraying. Typically, dynamic pressure measurements, dynamic and static strain, and dynamic acceleration measurements are desired on both stationary and rotating components of combustion turbine 10 together with component surface temperature and heat flux measurements. Thus, embedded sensors 204 may be configured as strain gages, thermocouples, heat-flux sensors, pressure transducers, micro-accelerometers as well as other desired sensors.

An advantage of utilizing thin film embedded sensors 204 is that the lead wires or connectors 202 may be contemporaneously deposited and routed using the same deposition process. In this aspect, the lead or connector 202 paths may be deposited over any desired route to connect one or more sensors 204 to a wireless telemetry device 206. Embodiments allow for connectors 202 to be the same material as a sensor 204 or other conducting materials having application specific electrical and temperature properties.

Wireless telemetry device 206 may be affixed to blade root 208 externally or embedded in such a way so that an outer mold line of the blade root is not significantly altered. This enables a turbine blade 200 instrumented with sensor 204, connectors 202 and device 206 to be installed into a rotor disk of turbine 16 in the same manner as a turbine blade that is not instrumented. In this respect, instrumented blade 200 may be manufactured having all components necessary for wirelessly extracting data indicative of various operating parameters or conditions of blade 200 and/or a barrier coating deposited thereon and transmitting that data to monitoring and control system 30.

A receiving antenna, such as a transceiver 56 shown in FIG. 1 may be located anywhere at which signals from wireless telemetry device 206 may be received. Embodiments of the invention are particularly useful for instrumenting rotating components, such as blades 18, 19, 200 of combustion turbine 10, which are otherwise difficult or impossible to instrument for receiving real-time operating parameter data.

The long-term stability, sensitivity and response of known metallic thermocouples and strain gages may not perform adequately for use in the hot gas path section of turbine 16 due to the harsh temperature environments. Embodiments of the invention allow for high temperature ceramic-based materials to be used in such environments due to their high stability, robustness and electrical properties at high temperatures, e.g., those exceeding about 1100° C. Selection of ceramic-based material for sensors 50, 204 may be based on the chemical and electrical stability of the active sensor elements at desired operating temperatures. Material selection may also be based on the magnitude of the materials' characteristics at elevated temperatures such as thermoelectric power for thermocouples and gage factor for strain gage.

Sensors 50, 204 may be formed as ceramic-based thermocouples used for temperature and/or heat flux measurements in the higher temperature sections of combustion turbine 10, such as within turbine 16. Three exemplary classes of materials for such sensor applications and other higher temperature applications, such as embedding sensors in barrier coatings, are the carbides, silicides and oxides. The carbides and silicides exhibit high heat-resistant and desirable electrical properties, and which may be used for providing thermoelectric power. At high temperatures, such as greater than about 1100° C., silicide materials may be used as thermocouples and heat flux sensors in oxidizing atmospheres since they form a passivating oxide film in air. Carbide materials may be used as thermocouples and heat flux sensors within inert and reducing environments. Exemplary silicide materials include $TiSi_2$, $CrSi_2$, $TaSi_2$ and $MoSi_2$ and exemplary carbide materials include WC, TaC, HfC, TiC, and ZrC. Alternate silicide and carbide materials may be used for application specific sensors.

Oxide materials are stable in oxidizing environments, are oxidation resistant and may be fabricated with different charge carrier concentrations to yield a stable and robust thermocouple as sensor 50, 204. FIG. 14 shows an exemplary oxide thermocouple sensor 210, which may be a thin film indium tin oxide (ITO) sensor deposited on a thermally grown oxide (TGO) layer 212. In an embodiment, sensor 210 may be deposited on TGO layer 212 to electrically insulate the sensor from a bond coat layer 214 deposited on a substrate 216, which may be a superalloy component such as an exemplary blade 200 or vane 22 within turbine 16. Alternate embodiments allow for sensor 210 to be deposited at various locations such as on a surface of a component or at various depths within a thermal barrier coating 218 provided the sensor is electrically insulated, as necessary, from surrounding materials.

Sensors 50, 204 may be configured as strain gages used to monitor the instabilities, structural integrity and other conditions of the turbine components such as blades 18, 19, 200 vanes 22, 23 and barrier coatings deposited thereon. FIG. 15 illustrates a representative configuration of an ITO strain gage 210 it being recognized that various embodiments of gage 210 may be adapted depending on the specific application.

Wireless telemetry device 206 may be employed for transmitting power and data to and receiving it from sensors 50, 204 deployed in various locations within combustion turbine 10 such as within compressor 12 and turbine 16. Passive or battery powered wireless sensing may not be feasible for use in the higher temperature environments of turbine 16 but may be used within compressor 12. Active power sources within turbine 16 may be used such as thermoelectric power where thermopiles generate the Seebeck effect for power, thermophotovoltaic power where radiant energy of a flame is used to generate power or thermionic power where a diode converts heat to electrical power. Embodiments using a rotating transmitter may induce power either by a stationary coil or from thermal or vibrational energy.

FIG. 16 is a schematic of an exemplary embodiment of a wireless telemetry device 206. Various embodiments of device 206 may be fabricated of application specific materials for wireless telemetry within combustor 12 or turbine 16. With respect to use with components in the hot gas path of turbine 16, which may exceed 1100° C., embodiments of device 206 may be placed or mounted in cooler areas but still be integral to the component. Device 206 may be formed from materials having temperature and electrical properties for use in an operating environment above about 250° C. Device 206 may be formed as a ceramic-based, high temperature circuit board or integrated chip that includes a plurality of electronic components such as resistors, capacitors, inductors, transistors, transducers, modulators, oscillators, transmitters, amplifiers, and diodes either embossed, surface mounted or otherwise deposited thereon with or without an integral antenna and/or power source.

FIG. 16 illustrates an embodiment of device 206 used for higher temperature applications in turbine 16 that may include an electroceramic board or chip 209, an electronic circuit 220, an operational amplifier 222, a modulator 224 and an RF oscillator/transmitter 226 electrically connected with each other via interconnects 228. It will be appreciated that the embodiment of FIG. 16 is provided as an exemplary embodiment and that other embodiments of device 206 are contemplated depending on application specific performance specifications and operating environments.

Embodiments of device 206 allow for a power source 230, and a transmitting and receiving antenna 232 to be fabricated on electroceramic board or chip 209. Alternate embodiments allow for a transmitter, such as transmitter 54 shown in FIGS. 6A, 6B and 6C to be separately mounted within turbine 16 and electrically connected with device 206 via connectors 52.

With reference to FIG. 16, the term electroceramic as used herein refers to ceramics and other materials having suitable electrical, chemical and thermal properties for use in high temperature environments. Examples of electroceramic materials that may be used to fabricate wireless telemetry device 206 for use in the higher temperature environment of turbine 16 are SiC, AlN, GaN as well as others known in the art such as carbides and nitrides. In this aspect, electroceramic chip 209 may be fabricated of electroceramic materials and electronic circuitry 220, amplifier 222, modulator 224, RF oscillator/transmitter 226, interconnects 228, power source 230 and antenna 232 may be fabricated of electroceramic or metallic materials, or of a combination of electroceramic materials and metallic materials having electrical and temperature properties suitable for use within turbine 16, e.g. greater than about 250° C. For example, Au, Ag or Pd may be used for interconnects 228. Circuitry 220 may form active and/or passive electronic components.

Wireless telemetry device 206 may be isolated for protection from dirt or other particulates within combustor 12 or turbine 16 by encasing the device in a ceramic material or phenolic resin for operation at the higher temperatures of turbine 16. Other suitable encasement materials may be used depending on the operating environment.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

We claim as our invention:

1. An instrumented component for use in a combustion turbine engine including a compressor, a rotor disk and a turbine, the instrumented component comprising:
   a substrate forming a blade for use within the combustion turbine engine;
   at least one sensor deposited in connection with the substrate for sensing a condition of the blade;
   a root portion integrally formed with the substrate for insertion within a mating segment of the rotor disk for securing the blade within the rotor disk;
   a wireless telemetry device affixed with the root portion, the wireless telemetry device comprising an electroceramic chip containing a plurality of electronic components configured to receive a data signal from the at least one sensor and wirelessly transmit the data signal to a receiving device; and
   a connector electrically connecting the at least one sensor to the wireless telemetry device for communicating the data signal from the at least one sensor to the wireless telemetry device.

2. The instrumented component of claim 1 further comprising:
   a bond coat deposited on at least a portion of the substrate;
   a thermally grown oxide layer forming an upper surface portion of the bond coat;
   the at least one sensor deposited on the thermally grown oxide layer; and
   a thermal barrier coating deposited over at least a portion of the thermally grown oxide layer.

3. The instrumented component of claim 2 further comprising the at least one sensor comprising at least one material selected from the group of an oxide, a carbide and a silicide.

4. The instrumented component of claim 2 further comprising the at least one sensor comprising an indium tin oxide material deposited on the thermally grown oxide layer to form a sensor selected from the group of a strain gage sensor and a heat flux sensor.

5. The instrumented component of claim 1 further comprising the wireless telemetry device capable of operation at temperatures of at least about 250° C. and the plurality of electronic components comprising an electroceramic material forming an electronic circuit.

6. The instrumented component of claim 5 further comprising the electroceramic material selected from the group of SiC, AlN and GaN.

7. The instrumented component of claim 1 further comprising:
   a bond coat deposited on at least a portion of the substrate;
   a thermally grown oxide layer forming an upper surface portion of the bond coat;
   the at least one sensor deposited on the thermally grown oxide layer;
   a thermal barrier coating deposited over at least a portion of the thermally grown oxide layer; and
   the wireless telemetry device comprising a combination of electroceramic materials and metallic materials forming the plurality of electronic components.

8. The instrumented component of claim 1 further comprising the wireless telemetry device comprising a combination of electroceramic materials and metallic materials forming the plurality of electronic components.

9. The instrumented component of claim 1 further comprising the at least one sensor comprising a ceramic-based thermocouple material embedded within a thermal barrier coating deposited on the substrate.

10. The instrumented component of claim 1 further comprising the plurality of electronic components comprising an oscillator, an amplifier and an antenna.

11. An instrumented component for use in a casing of a combustion turbine engine, including a compressor, a rotor disk and a turbine, the component comprising:
   a substrate forming a blade;
   a root portion integrally formed with the substrate for insertion within a mating segment of the rotor disk for securing the blade within the rotor disk;
   a sensing material deposited in connection with the substrate for sensing a condition of the blade;

a wireless telemetry device secured with the root portion; and a connector electrically connecting the sensing material with the wireless telemetry device.

12. The component of claim 11 further comprising:
a bond coat deposited on a surface of the substrate;
an insulating layer formed on the bond coat;
the sensing material deposited on the insulating layer forming a sensor; and
a thermal barrier coating deposited over the sensor.

13. The component of claim 11 further comprising the wireless telemetry device comprising an electroceramic material deposited on an electroceramic chip to form at least one electronic circuit configured to receive a data signal over the connector and wirelessly transmit the data signal to a receiving device.

14. The component of claim 12 wherein the wireless telemetry device, comprises:
a transmitter secured with the root portion;
an antenna secured with the root portion; and
a ceramic material covering the transmitter and the antenna.

15. A combustion turbine engine comprising:
a compressor having a casing;
a compressor blade assembly comprising a hub and a plurality of compressor blades having respective compressor blade roots integrally formed with the blades and inserted within mating segments of the hub connecting the plurality of compressor blades to the hub;
a first sensing material deposited on a surface of one of the plurality of compressor blades;
a connector in communication with the first sensing material for routing a first data signal from the first sensing material to a termination point;
a first wireless telemetry device secured to the root of the blade, the first wireless telemetry device receiving the first data signal from the first sensing material;
a ceramic material covering the first wireless telemetry device;
a transceiver external to the compressor casing for receiving a wirelessly transmitted data signal from the first wireless telemetry device;
a combustor; and
a turbine having a casing.

16. The combustion turbine engine of claim 15 further comprising the wireless telemetry device comprising a semiconducting material forming an electronic circuit, an antenna and a transmitter.

17. The combustion turbine engine of claim 15 further comprising:
a turbine blade assembly comprising a hub and a plurality of turbine blades having respective blade roots connecting the plurality of turbine blades to the hub;
a second sensing material deposited on the turbine blade assembly, the second sensing material comprising a material selected from the group of a carbide, a silicide and an oxide;
a connector in communication with the second sensing material for routing a second data signal from the second sensing material to a termination point proximate at least one turbine blade root;
a second wireless telemetry device affixed to the at least one turbine blade root; and
a transceiver external to the turbine casing for receiving the wirelessly transmitted data signals.

18. The combustion turbine engine of claim 17 further comprising the wireless telemetry device comprising an electroceramic material deposited on an electroceramic chip forming at least one electronic circuit configured to receive the second data signal and wirelessly transmit the second data signal to the transceiver, the electroceramic material selected from the group of SiC, AlN and GaN.

* * * * *